United States Patent [19]

Shimada et al.

[11] 3,968,090
[45] July 6, 1976

[54] METHOD FOR REMOVING HEAT OF POLYMERIZATION

[75] Inventors: Kazushi Shimada; Toru Maeda; Yasuhiko Iwaoka; Hisao Anzai, all of Otake, Japan

[73] Assignee: Mitsubishi Rayon Co., Ltd., Tokyo, Japan

[22] Filed: Dec. 23, 1974

[21] Appl. No.: 535,489

[30] Foreign Application Priority Data
Dec. 28, 1973  Japan.................................. 49-950
June 27, 1974  Japan................................ 49-72805

[52] U.S. Cl................................. 526/88; 526/74; 526/328; 526/329; 526/342
[51] Int. Cl.² .............. C08F 218/00; C08F 220/00; C08F 222/00; C08F 120/02
[58] Field of Search ................. 260/89.5 A, 86.1 E, 260/87.3, 85.5 ES, 93.5 R, 86.7, 88.7 G

[56] References Cited
UNITED STATES PATENTS
3,439,065   4/1969   Luftglass....................... 260/89.5 A Primary Examiner—Harry Wong, Jr.
Assistant Examiner—Herbert J. Lilling
Attorney, Agent, or Firm—Armstrong, Nikaido & Wegner

[57] ABSTRACT

A method and an apparatus for removing the heat of polymerization evolved during a polymerization procedure carried out while the liquid polymerization mixture is stirred in a reactor are provided. A condensable vapor present in the space above the liquid level of the polymerization mixture inside the reactor is condensed by a cooling means provided in said space while the inner pressure of the reactor is maintained at a level such that the polymerization mixture does not boil. Preferably, the vapor phase is stirred.

3 Claims, 9 Drawing Figures

METHOD FOR REMOVING HEAT OF POLYMERIZATION

BACKGROUND OF THE INVENTION

This invention relates to a method and an apparatus for removing the heat of polymerization evolved during a polymerization carried out while the liquid polymerization mixture is stirred.

By the term "heat of polymerization" used herein we intend to refer to both the heat of a polymerization reaction, i.e. the heat evolved due to the polymerization reaction of monomers, and the heat of agitation, i.e. the heat evolved by stirring the liquid polymerization mixture. Removal of the heat of polymerization with a high efficiency using the known methods is difficult, due to problems accompanying these methods. Methods for the removal of the heat of polymerization hitherto known in the art are broadly divided into the following two types. The first type involves the utilization of a heat transfer medium to which heat is transferred from the polymerization mixture due to thermal conduction. The second type involves evaporation of the volatile liquid by boiling the polymerization mixture whereby latent heat of vaporization is removed.

The first type method is performed, for example, by providing a jacket on the outer periphery of a polymerization reactor, or a coil or draft tube submerged in the polymerization mixture inside a polymerization reactor, and passing a cold heat transfer medium through the jacket, coil or draft tube. This method is not advantageous for the following reasons. When the polymerization mixture increases in viscosity, the polymerization mixture is liable to form a stagnant layer in close proximity to the wall, through which heat is transferred and which is maintained at a reduced temperature by the heat transfer medium, and the polymer is liable to be deposited on such a wall. The stagnant layer of the polymerization mixture and the deposited polymer reduce the efficiency of heat removal from the polymerization mixture. Therefore, it has been hitherto proposed to scrape off the deposited polymer or remove the stagnant layer from the wall. However, this requires an intricate and expensive scraping apparatus, and minute materials produced by the wearing out of the apparatus are incorporated into the polymer product, which leads to a reduction of quality of the product.

The second type method is performed, for example, by boiling the polymerization mixture thereby evaporating a volatile liquid, e.g. the monomer in the case of bulk polymerization, or a mixture of the monomer, a solvent and optionally a boiling accelerator in the case of solution polymerization, and condensing the vapor in a reflux condenser provided outside the reactor, or by flash evaporating the volatile liquid outside the reactor. These two methods are advantageous in that the efficiency of heat removal is high.

However, the former method, i.e. that involving the step of reflux condensation, possesses the following defects. The polymer is liable to be deposited on the inner walls of the reactor and the condenser due to a large amount of bubbles and entrainments in the vapor. Thus, in order to prevent the bubbles and entrainments from entering into the condenser, it becomes necessary to employ a large volume polymerization reactor so as to ensure an increased vacant space above the liquid level inside the reactor. This leads to reduction in the efficiency of polymer production per unit volume of the apparatus. Furthermore, in the case of a continuous polymerization, since the inner pressure of the reactor should be maintained at a low level, so as to ensure boiling of the polymerization mixture, firstly, it is difficult to maintain the head from the reactor to the discharge pump at a level sufficient for smoothly discharging the polymerization product from the reactor and, secondly, undesirable cavitation occurs in the discharge pump due to the boiling of liquid and this makes it difficult to smoothly discharge the polymerization product.

The latter method, i.e. that involving the step of flash evaporation by using an evaporating means placed outside the reactor, can be employed for a continuous polymerization because the inner pressure of the reactor can be maintained at a high level. However, this method also involves some problems. That is, the polymer is liable to be deposited on the inner walls of the reactor and the flash evaporator, and it becomes difficult to deal with the polymerization mixture because of increase in viscosity due to the increase in the polymer content and due to the reduction in the temperature of the polymerization mixture caused by flash evaporation. Furthermore, the flash evaporator is expensive and intricate.

Therefore, it is a primary object of the present invention to provide a method wherein heat of polymerization is removed with improved efficiency and without the above-mentioned defects of the known methods.

Another object is to provide an apparatus for removing the heat of polymerization which is neither intricate nor expensive and possesses none of defects of the known apparatuses.

Other objects and advantages of the present invention will be apparent from the following description.

SUMMARY OF THE INVENTION

In accordance with the present invention there is provided a method for removing the heat of polymerization evolved during a polymerization procedure carried out while the liquid polymerization mixture is stirred, which comprises the step of:

condensing a condensable vapor present in the space above the liquid level of the polymerization mixture inside the polymerization reactor by a cooling means provided in said space while the inner pressure of the polymerization reactor is maintained at a level such that the polymerization mixture does not boil.

DETAILED DESCRIPTION OF THE INVENTION

In the method of the invention, polymerization is carried out while the inner pressure of the polymerization reactor is maintained at a level such that the polymerization mixture does not boil. Therefore, it is necessary to stir the polymerization mixture in order to facilitate the renewal of the volatile surface and enhance the evaporation rate of the volatile liquid.

The stirring of the polymerization mixture is performed preferably by using an agitating means of the type which produces circulating flows of the polymerization mixture in the vertical direction, such as for example a double helical ribbon agitator or a helical screw agitator with draft tube. This type agitating means is effective particularly when the polymerization mixture has a high viscosity. It is more preferable to employ, in addition to the above type agitating means, an agitating means of a small size with its propeller located immediately beneath the free surface of the polymerization mixture so as to stir locally the upper part of the polymerization mixture and facilitate the renewal of the liquid surface. It is also preferable to provide a duct vertically arranged outside the reactor, one end of which opens at the bottom of the reactor and the other end of which opens in the space above the liquid level or immediately beneath the liquid level, and force the polymerization mixture to pass upwardly therethrough.

The polymerization reactor used in the practice of the invention may be of a closed vessel type equipped with a stirrer, e.g. popularly called an "agitated vessel" or "stirred tank reactor". An elongated type or a tower type, having no stirrer, is not suitable for use in the practice of the invention. However, an elongated type or a tower type may be used if it is equipped with a stirrer for mixing at least the upper part of the polymerization mixture.

The invention will be illustrated in detail with reference to the accompanying drawings, in which.

Figure 1:
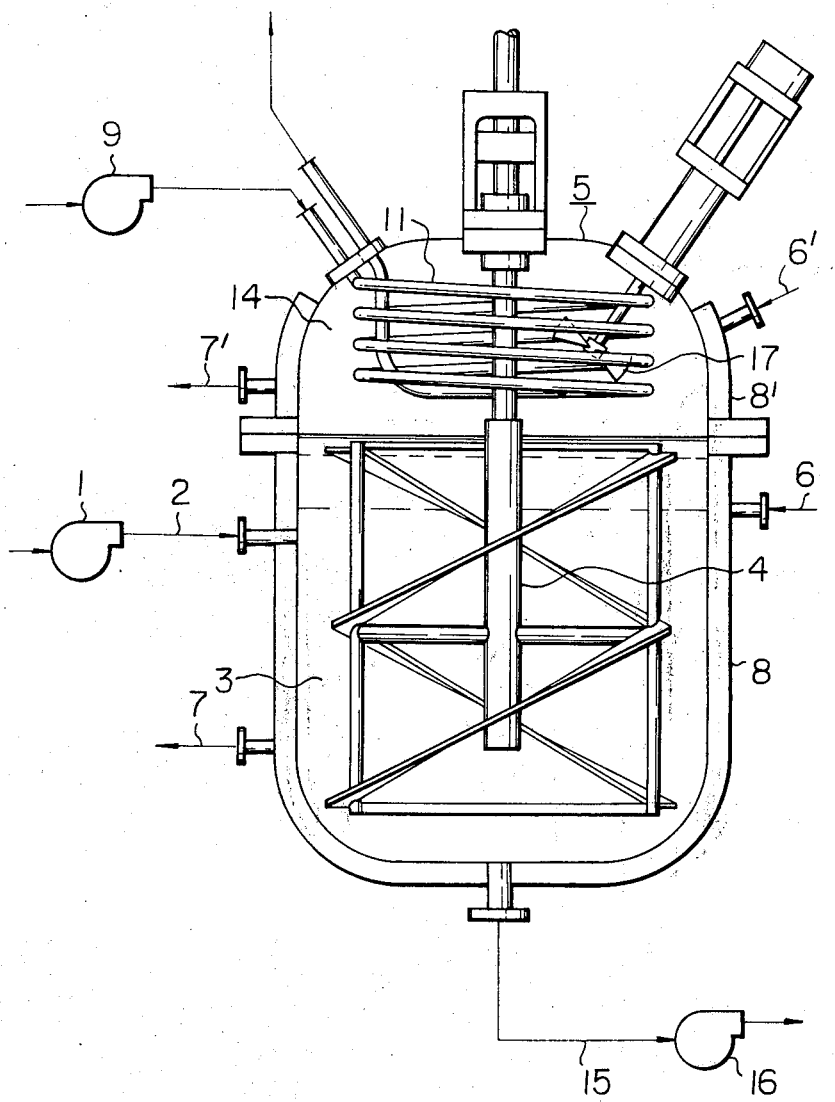
FIG. 1 is an elevation view with portions sectioned along the principal axis of a polymerization reactor.

In FIG. 1, which shows a continuous polymerization tank reactor as one example of the reactors used in the practice of the invention, a monomer feed of a predetermined composition is forced by a pump 1 through a line 2 into a reactor 5. The reactor 5 is equipped with two outer jackets 8 and 8'. A heat transfer medium of a low temperature is forced to pass through the upper jacket 8' from a line 6' to a line 7' for cooling the vapor phase in a space 14 above the free surface of the polymerization mixture. A heat transfer medium of a predetermined temperature is forced to pass through the lower jacket 8 from a line 6 to a line 7 for maintaining the polymerization mixture at the desired temperature. The reactor 5 is equipped with a double helical ribbon agitator 4 for mixing the polymerization mixture 3, a spiral tube heat exchanger 11 for condensing a condensable vapor present in the space 14 and a propeller stirrer 17 for mixing the vapor phase in the space 14. A heat transfer medium of a low temperature is forced to pass through the coil heat exchanger 11 by a pump 9. An inert gas, such as nitrogen, is enclosed in the reactor 5, the amount of which is sufficient for maintaining the inner pressure of the reactor 5 at a level such that the polymerization mixture 3 does not boil. The polymerization mixture having a stated polymer content is continuously withdrawn through a line 15 by a pump 16.

Figure 2A:
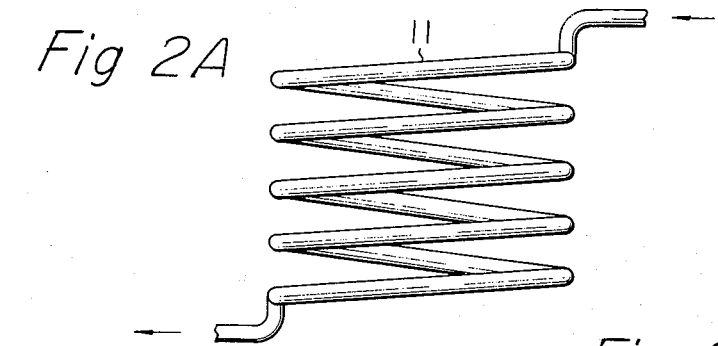
FIGS. 2A, 2B, 2C and 2D show heat exchangers used for cooling the vapor phase inside the reactor; and, FIGS. 3A, 3B, 3C and 3D show stirring means used for stirring the vapor phase inside the reactor.
Figure 2B:
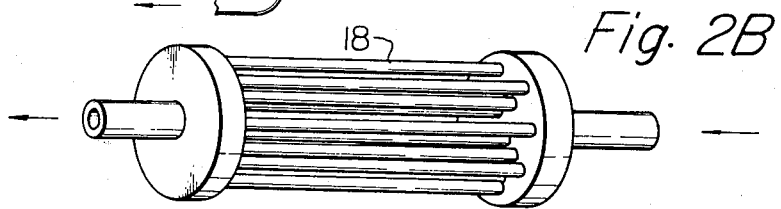
Figure 2C:
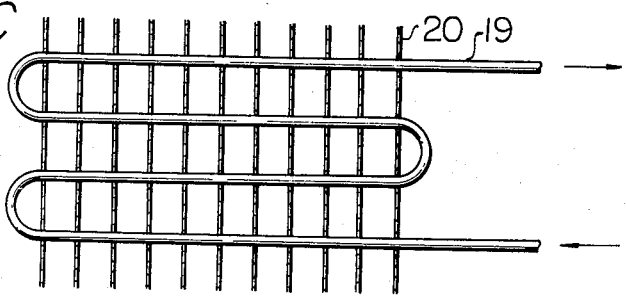
Figure 2D:
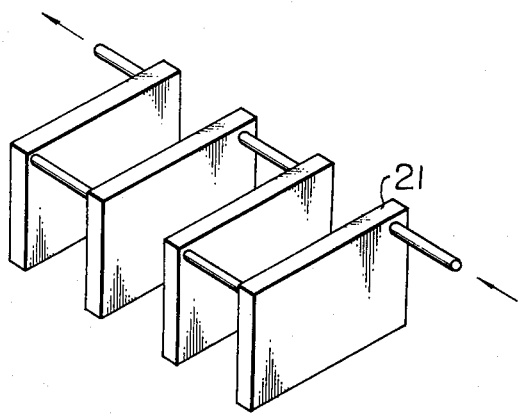

The cooling means to be provided in the space above the liquid level inside the reactor may be any type of heat exchanger. Typical examples of the heat exchanger are shown in FIGS. 2A, 2B, 2C and 2D. FIG. 2A shows a spiral tube exchanger consisting of a concentric spirally wound coil 11, which is similar to that in FIG. 1. FIG. 2B shows a multi-pipe exchanger consisting of a bundle of pipes 18. FIG. 2C shows a tubular exchanger 19 provided with a plurality of fins 20. FIG. 2D shows a plate-type exchanger consisting of a plurality of hollow plates 21 connected in series.

By the provision of the heat exchanger the entire vapor phase in the space above the polymerization mixture inside the reactor is uniformly cooled and, therefore, a main portion of the condensable vapor in the space is condensed into mists in the vapor phase, i.e. only a minor portion is condensed on the heat exchanger and the inner wall of the reactor. Accordingly, undesirable deposit of polymer on the heat exchanger and the inner wall of the reactor can be minimized. Further, such uniform cooling of the vapor phase serves to enhance the vaporization of the volatile liquid.

It is preferable to provide the polymerization reactor with an external cooling jacket, as shown by the reference numeral 8' in FIG. 1, located on the upper part of the periphery of the reactor. This external cooling jacket serves for cooling the inner wall of the reactor, which wall is in contact with the vapor phase, and therefore enhances the uniform cooling of the vapor phase.

Furthermore, it is preferable to provide the reactor with a stirring means located in the vapor phase for stirring the vapor phase, as shown by the reference numeral 17 in FIG. 1. Such a stirrer serves to enhance the vapor-film heat-transfer coefficient on the heat-transfer surface of the heat exchanger as well as to reduce the vapor film thickness in close proximity to the free surface of liquid. Accordingly, the evaporation is enhanced and the amount of heat removal increases. The stirrer also serves to control the temperature of the polymerization mixture by suitably varying the rate of revolution of the fan. Such a control procedure is advantageous in that it is possible to quickly vary the temperature, because the temperature responds quickly to variation in the rate of revolution of the fan.

The stirring means employed may be of any known type fan which is used for stirring gases. Several examples of the stirring means are shown in FIGS. 3A, 3B, 3C and 3D, in which a turbine blade type centrifugal fan, a straight blade type centrifugal fan, a Bull-margin blade type centrifugal fan and a propeller type fan are illustrated, respectively. The fan of the stirring means is located in the vapor phase. The fan may be independent from the stirrer for stirring the polymerization mixture, as shown in FIG. 1, or the fan may be fitted to the upper part, i.e. above the liquid level, of the axis of the stirrer for the polymerization mixture. The former is more preferable than the latter, because the former can be operated at an optional rate of revolution and independently from the stirrer for stirring the polymerization mixture and, hence, it is easier to increase the heat removal and control the polymerization temperature with the former than with the latter.

The inner pressure of the reactor may be suitably varied depending upon the type of polymerization and the particular monomer, provided that it is maintained at a level such that the boiling of the polymerization mixture does not occur. The control of the inner pressure is performed by enclosing an inert gas such as nitrogen and carbon dioxide in the reactor. Since the polymerization mixture does not boil, neither bubbling nor entrainment of polymer occurs. Therefore, undesirable deposit of the polymer is not formed on the cooling means and the inner wall of the reactor, and the volume of the vacant space inside the reactor can be minimized.

The monomer employed in the practice of the invention is selected from those which possess a vinyl or vinylidene group. The monomer includes, for example, alkyl acrylates such as methyl acrylate, ethyl acrylate, butyl acrylate, isobutyl acrylate, 2-ethylhexyl acrylate and n-octyl acrylate; alkyl methacrylates such as methyl methacrylate, ethyl methacrylate, butyl methacrylate, n-hexyl methacrylate, n-octyl methacrylate and lauryl methacrylate; aromatic compounds such as styrene and α-methylstyrene; and acrylonitrile. These monomers may be used alone or in combination. Also, a solution of an elastomeric polymer dissolved in one or more monomers of the above-listed monomers may be employed for the practice of the invention. Among the vinyl and vinylidene monomers, methyl methacrylate, and a mixture of methyl methacrylate and methyl acrylate, ethyl acrylate, butyl acrylate or other copolymerizable monomer are preferable. If desired, additives such as an initiator, polymerization controlling agent, ultraviolet absorber, colorant and plasticizer may be incorporated in the monomer feed.

The method of the invention is usually employed in bulk and solution polymerization procedures. The polymerization may be carried out in a continuous or batchwise manner. The method of the invention is advantageously employed in a bulk polymerization procedure, particularly a continuous bulk polymerization procedure. When the method of the invention is employed in a solution polymerization procedure, a suitable amount of solvent such as toluene, xylene, cumene and methyl isobutyrate is incorporated into the monomer feed.

Usually, azo type or peroxide type radical polymerization initiators are employed. Polymerization is carried out preferably at high temperatures, e.g. from 100° to 170°C, and more preferably from 130° to 170°C.

The following examples are given to illustrate the present invention and are not to be considered as limiting in any sense. In the examples, a stirred tank reactor, which is similar to that illustrated in FIG. 1 but not provided with the upper external jacket 8', having an inner diameter of 500 mm and an inner volume of 100 l was used. All parts and percentages are by weight.

EXAMPLE 1

The propeller stirrer 17 was detached from the reactor. The spiral tube heat exchanger 11 employed consisted of a spirally wound stainless steel coil tube having a length of 6.3 m, an inner diameter of 4 mm and an outer diameter of 6 mm.

A monomer feed mixture of 100 parts of methyl methacrylate, 0.28 part of tert.-butyl mercaptan and 0.0017 part of di-tert.-butyl peroxide was continuously fed to the reactor at a rate of 22 l/hr. The polymerization mixture was maintained at 155°C by passing a heat transfer medium through the external jacket 8 and water through the spiral tube exchanger 11, separately. The inner pressure of the reactor was maintained at 8 Kg/cm$^2$ gauge by enclosing nitrogen gas to prevent the boiling. The polymer content in the polymer mixture at a steady state proved to be approximately 55% as determined by gas chromatography. While the above conditions were maintained constant, the rate of stirring the polymerization mixture was varied, and the temperatures of the cooling waters introduced into and withdrawn from the spiral tube exchanger were measured. Results are shown in Table I, below.

Table I

| Stirring rate (rpm) | Temperature of cooling water at inlet (°C) | Temperature of cooling water at outlet (°C) | Flow rate of cooling water (Kg/hr) | Amount of heat removed by cooling water (Kcal/hr) |
| --- | --- | --- | --- | --- |
| 70 | 25.0 | 52.5 | 67 | 1840 |

Table I-continued

| Stirring rate (rpm) | Temperature of cooling water at inlet (°C) | Temperature of cooling water at outlet (°C) | Flow rate of cooling water (Kg/hr) | Amount of heat removed by cooling water (Kcal/hr) |
| --- | --- | --- | --- | --- |
| 80 | 25.0 | 55.3 | 67 | 2030 |
| 90 | 25.1 | 57.8 | 67 | 2190 |

The heat of polymerization in the reactor used herein is approximately 1,600 Kcal/hr. The polymerization was continued over a period of approximately 70 hours. No trouble occurred, and the polymer was not deposited on the spiral tube exchanger and the upper part of the inner wall of the reactor.

EXAMPLE 2

Following the procedure described in Example 1, continuous polymerization of methyl methacrylate was carried out wherein the length of the stainless steel coil tube was changed to 10 m with all other conditions remaining substantially the same. While the polymerization conditions were maintained constant, the rate of stirring the polymerization mixture was varied. The results of the heat removal are shown in Table II, below.

Table II

| Stirring rate (rpm) | Temperature of cooling water at inlet (°C) | Temperature of cooling water at outlet (°C) | Flow rate of cooling water (Kg/hr) | Amount of heat removed by cooling water (Kcal/hr) |
| --- | --- | --- | --- | --- |
| 70 | 25.3 | 54.0 | 83 | 2380 |
| 80 | 25.2 | 56.6 | 83 | 2610 |

The polymerization was continued over a period of approximately 55 hours. No trouble occurred, and the polymer was not deposited on the spiral tube exchanger and the upper part of the inner wall of the reactor.

EXAMPLE 3

Figure 3A:
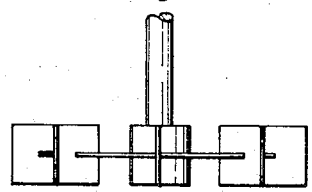
Figure 3A:
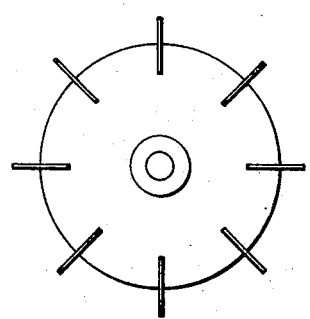
Figure 3B:
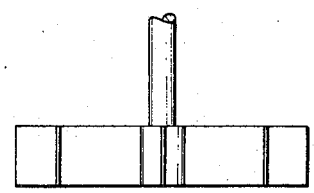
Figure 3B:
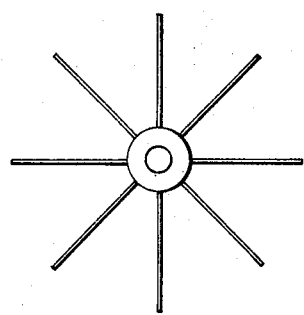
Figure 3C:
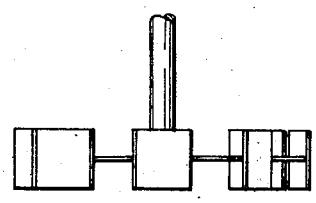
Figure 3C:
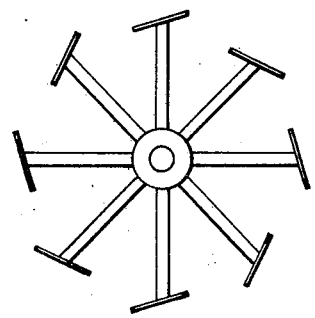
Figure 3D:
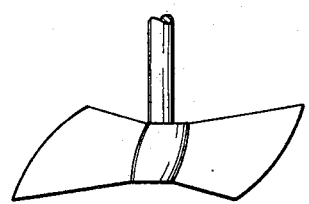
Figure 3D:
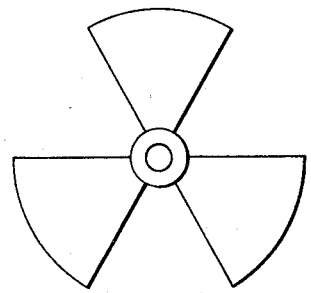

Following the procedure described in Example 1, continuous polymerization of methyl methacrylate was carried out using a reactor as shown in FIG. 1 equipped with a 12 centimeter diameter propeller fan, as shown in FIG. 3D, for stirring the vapor phase. The rate of stirring the polymerization mixture was 70 rpm. All other conditions remained substantially the same. While the polymerization conditions were maintained constant, the rate of stirring the vapor phase was varied. The results of the heat removal are shown in Table III, below.

Table III

| Rate of stirring vapor phase (rpm) | Temperature of cooling water at inlet (°C) | Temperature of cooling water at outlet (°C) | Flow rate of cooling water (Kg/hr) | Amount of heat removed by cooling water (Kcal/hr) |
| --- | --- | --- | --- | --- |
| 1750 | 13.5 | 59.2 | 72.0 | 3290 |
| 400 | 13.6 | 48.2 | 72.0 | 2490 |
| 0 | 13.2 | 39.5 | 72.0 | 1890 |

The polymerization was continued over a period of approximately 74 hours. No trouble occurred, and the polymer was not deposited on the spiral tube exchanger and the upper part of the inner wall of the reactor.

This example shows that, firstly, the stirring of the vapor phase enhances the amount of the heat removal and, secondly, the amount of the heat removal can easily be controlled by varying the rate of revolution of the vapor phase stirring means.

EXAMPLE 4

Following the procedure described in Example 1, copolymerization of methyl methacrylate and methyl acrylate was continuously carried out using a monomer feed mixture consisting of 95 parts of methyl methacrylate, 5 part of methyl acrylate, 0.28 part of tert.-butyl mercaptan and 0.0014 part of di-tert.-butyl peroxide. For stirring the polymerization mixture, the agitator was coaxially equipped with a straight blade type centrifugal fan, as shown in FIG. 3B, at a height of approximately 15 cm above the liquid level. The fan had a diameter of 15 cm and each fan blade had a width of 4 cm. The polymer content in the polymerization mixture was approximately 53%. All other conditions remained substantially the same. While the polymerization conditions were maintained constant, the rate of stirring the polymerization mixture was varied (the rate of stirring the vapor phase was similarly varied). Results of the heat removal are shown in Table IV, below.

Table IV

| Rate of stirring liquid phase (vapor phase) | Temperaure of cooling water at inlet (°C) | Temperature of cooling water at outlet (°C) | Flow rate of cooling water (Kg/hr) | Amount of heat removed by cooling water (Kcal/hr) |
|---|---|---|---|---|
| 70 | 24.1 | 51.4 | 78 | 2130 |
| 80 | 24.0 | 54.5 | 78 | 2380 |

The polymerization was continued over a period of approximately 60 hours. No trouble occurred, and the polymer was not deposited on the centrifugal fan and the upper part of the inner wall of the reactor.

COMPARATIVE EXAMPLE 1

Following the procedure described in Example 1, continuous polymerization of methyl methacrylate was carried out, wherein the spiral tube heat exchanger 11 was detached from the reactor and, in substitution therefor, a multi-pipe heat exchanger consisting of a bundle pipes and having a heat transfer area of one square meter was provided outside the reactor. The multi-pipe heat exchanger was connected by conduits with the reactor such that the vapor was passed from the space above the liquid level inside the reactor to the pipes of the heat exchanger where the vapor is condensed and flows into the reactor. The rate of stirring the polymerization mixture was maintained at 90 rpm. All other conditions remained substantially the same. While the polymerization conditions were maintained constant, the temperatures of the cooling waters introduced into and withdrawn from the heat exchanger were measured. Results were as follows.

Temperature of cooling water at inlet; 25.1°C
Temperature of cooling water at outlet; 26.7°C
Flow rate of cooling water; 67 kg/hr
Amount of heat removed by cooling water; 110 Kcal/hr Although some preferred embodiments of the invention have been illustrated, modifications may occur to those skilled in the art within the scope of the claims and the spirit of the invention.

What is claimed is:

1. A method for removing the heat of polymerization evolved during bulk polymerization of methyl methacrylate or a mixture of a predominant amount of methyl methacrylate and a minor amount of at least one other copolymerizable monomer in which method the liquid polymerization mixture is stirred while polymerization is performed, comprising the step of: condensing a condensable vapor present in the space above the liquid level of the polymerization mixture inside the polymerization reactor by a cooling means provided in said space while the vapor phase above the liquid level is stirred and the inner pressure of the polymerization reactor is maintained at such a level that the polymerization mixture does not boil.

2. A method as recited in claim 1, wherein methyl methacrylate is the sole polymerizable monomer.

3. A method as recited in claim 1, wherein the other copolymerizable monomer is a member selected from the group consisting of methyl acrylate, ethyl acrylate and butyl acrylate.

* * * * *